(12) United States Patent
Landrum (10) Patent No.: US 8,539,911 B1
(45) Date of Patent: Sep. 24, 2013

(54) DISPOSABLE FELINE LITTER BOX

(76) Inventor: Kathryn B. Landrum, Bullard, TX (US)

(*) Notice: Subject to any disclaimer, the term of this patent is extended or adjusted under 35 U.S.C. 154(b) by 164 days.

(21) Appl. No.: 13/110,121

(22) Filed: May 18, 2011

(51) Int. Cl.
 *A01K 29/00* (2006.01)
 *A01K 1/03* (2006.01)

(52) U.S. Cl.
 USPC .......................................... 119/168; 119/498

(58) Field of Classification Search
 USPC .................. 119/161, 163, 165, 168, 498, 499
 See application file for complete search history.

(56) References Cited

U.S. PATENT DOCUMENTS

| | | | |
|---|---|---|---|
| 4,348,982 A | 9/1982 | Selby | |
| 4,776,300 A | 10/1988 | Braddock | |
| 4,800,842 A | 1/1989 | Jones, Jr. | |
| 4,884,527 A | 12/1989 | Skirvin | |
| 4,940,016 A | 7/1990 | Heath | |
| 5,203,282 A * | 4/1993 | Hasiuk | 119/168 |
| 5,211,134 A | 5/1993 | Bolo, III | |
| 5,582,135 A | 12/1996 | Bellows | |
| 5,730,085 A | 3/1998 | Santoiemmo | |
| 5,913,282 A | 6/1999 | Indes et al. | |
| 6,463,881 B1 * | 10/2002 | Reitz | 119/163 |
| 7,455,032 B2 * | 11/2008 | Axelrod | 119/499 |
| 8,256,380 B2 * | 9/2012 | Bjornson | 119/168 |
| 2006/0137622 A1 * | 6/2006 | Lamstein | 119/499 |
| 2011/0132274 A1 * | 6/2011 | Cagle | 119/498 |

* cited by examiner

*Primary Examiner* — Son T Nguyen
*Assistant Examiner* — Kathleen Alker
(74) *Attorney, Agent, or Firm* — Montgomery Patent & Design; Robert C. Montgomery (57) ABSTRACT

A disposable feline litter box includes a tray prefilled with litter and including a permanently affixed upwardly extendable enclosure. An end face of the enclosure includes a hinged door flap which allows a feline to enter and exit the enclosure by pushing the flap in the appropriate direction. The various components of the litter box are made of bio-degradable materials. The litter box is initially provided in a collapsed configuration to allow for storage and transportation and is returned to the collapsed configuration for disposal.

17 Claims, 7 Drawing Sheets

DISPOSABLE FELINE LITTER BOX

RELATED APPLICATIONS

The present invention was first described in a notarized Official Record of Invention on Jul. 6, 2010, that is on file at the offices of Montgomery Patent and Design, LLC, the entire disclosures of which are incorporated herein by reference.

FIELD OF THE INVENTION

The present invention relates generally to litter boxes for indoor pets, and in particular, to deployable pet litter container that provides portability, temporary use, and sanitary disposal of feline litter after urination or defecation.

BACKGROUND OF THE INVENTION

Keeping pets is a never-ending task, requiring one to constantly feed groom and clean-up after their animal friends. For those that raise, breed, or board cats; their responsibilities also include maintenance of a litter box. While the use and maintenance of a litter box at home is relatively easy, it becomes a much different story when the pet and pet owner travel or are away from home for any length of time. The cat owner must ensure that the regular litter box, a bag of cat litter, tools to remove droppings, and supplies to clean the litter box all must travel as well. While these supplies can be packed, they do require some planning and time to accomplish and often times take up valuable space. However, in emergency situations, such time is often not available. Unfortunately, this makes use of the standard litter and box system inadequate for travelling purposes.

Various devices have attempted to provide portable pet litter pans, containers, or similar systems. Typically these attempts include lightweight deployable enclosures which form box-like containers when in an erected state. Examples of these attempts can be seen by reference to several U.S. patents. U.S. Pat. No. 4,348,982 issued to Selby discloses a disposable cat relief chamber. U.S. Pat. No. 4,776,300 issued to Braddock discloses a corrugated kitty litter box. U.S. Pat. No. 4,800,842 issued to Jones, Jr. discloses a disposable pet sanitary station having a fixed lower compartment and an expandable upper compartment. U.S. Pat. No. 4,884,527 issued to Skirvin discloses a self-contained disposable animal commode. U.S. Pat. No. 4,940,016 issued to Heath discloses a unitary collapsible and disposable pet litter container. U.S. Pat. No. 5,211,134 issued to Bolo, III discloses a collapsible disposable litter box. U.S. Pat. No. 5,582,135 issued to Bellows discloses a collapsible and disposable pet litter container. U.S. Pat. No. 5,730,085 issued to Santoiemmo discloses a lightweight disposable kitty litter box. U.S. Pat. No. 5,913,282 issued to Indes et al. discloses a pet litter box.

While these devices may achieve their purported objective each suffers from one (1) or more disadvantage or deficiency related to design or utilization. Particularly, these attempts appear to lack sufficient structural integrity to withstand use by the cat. Many of the devices also require somewhat complicated tongue and groove, fold and attach systems which can be cumbersome to set up in many common situations.

SUMMARY OF THE INVENTION

The inventor has therefore recognized the aforementioned inherent problems and lack in the art and observed that there is a need for a device which provides a complete litter box which is easy and quick to set us and use as well as easy to care for. In accordance with the invention, it is an object of the present disclosure to solve these problems.

The inventor recognized these problems and has addressed this need by developing a disposable feline litter box that provides cat owners the ability to provide their cat a completely functional litter box anywhere and anytime, in a manner which is quick, easy, and effective. The inventor has thus realized the advantages and benefits of providing the disposable feline litter box which includes a generally rectangular tray having a litter-filled interior receptacle. An enclosure defining a hollow interior and having sides made up of a plurality of accordion pleats is affixed to and over the tray. A top is affixed to an upper end of the enclosure. An opening is disposed in at least one of the sides of the enclosure for the ingress and egress of the cat. A door is hingedly attached to the enclosure for covering the opening. The pleats of the enclosure are movable toward each other to place the enclosure in a collapsed state when the top is moved downwardly relative to the tray. The pleats are also movable away from each other to place the enclosure in an expanded state when the top is moved upwardly relative to the tray.

In at least one (1) embodiment, a pair of linkages is pivotably attached between the tray and the top on opposing sides of the enclosure to provide structural support for the enclosure. The pair of linkages pivots to a generally horizontal orientation when the enclosure is in the collapsed state. The pair of linkages pivots to a generally vertical orientation when the enclosure is in the expanded state.

In at least one (1) embodiment, a pair of stops extend outwardly from opposing sides of the tray and are adjacent to a lower end portion of each of the pair of linkages. A lower side portion of each of the pair of linkages contacts the pair of stops when the enclosure is in the expanded state and restricted the rotating motion of the linkages.

In at least one (1) embodiment, a pair of straps is affixed to the tray and releasably secured to the top around the enclosure. Each of the pair of straps includes a plurality of first snap features and the top includes a plurality of second snap features. The first snap features engagingly mate with the second snap features to secure the straps to the top when the enclosure is in the collapsed state.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

| | DESCRIPTIVE KEY |
|---|---|
| 10 | disposable feline litter box |
| 11 | tray |
| 12 | top |
| 13 | enclosure |
| 14 | door |
| 15a | first link |
| 15b | second link |
| 16a | third link |
| 16b | fourth link |
| 17a | first stop |
| 17b | second stop |
| 18a | first stay |
| 18b | second stay |
| 19a | first strap end |
| 19b | second strap end |
| 20 | strap |
| 21a | first snap feature |
| 21b | second snap feature |
| 22a | first handle member |
| 22b | second handle member |
| 23 | carrying handle |
| 24 | hinge |
| 25a | first pivot |
| 25b | second pivot |
| 26a | third pivot |
| 26b | fourth pivot |
| 27a | fifth pivot |
| 27b | sixth pivot |
| 28 | litter |
| 81 | feline |
| 82 | floor |
| 90 | first alternate disposable feline litter box |
| 95 | second alternate disposable feline litter box |

DETAILED DESCRIPTION OF THE PREFERRED EMBODIMENT

Figure 4:
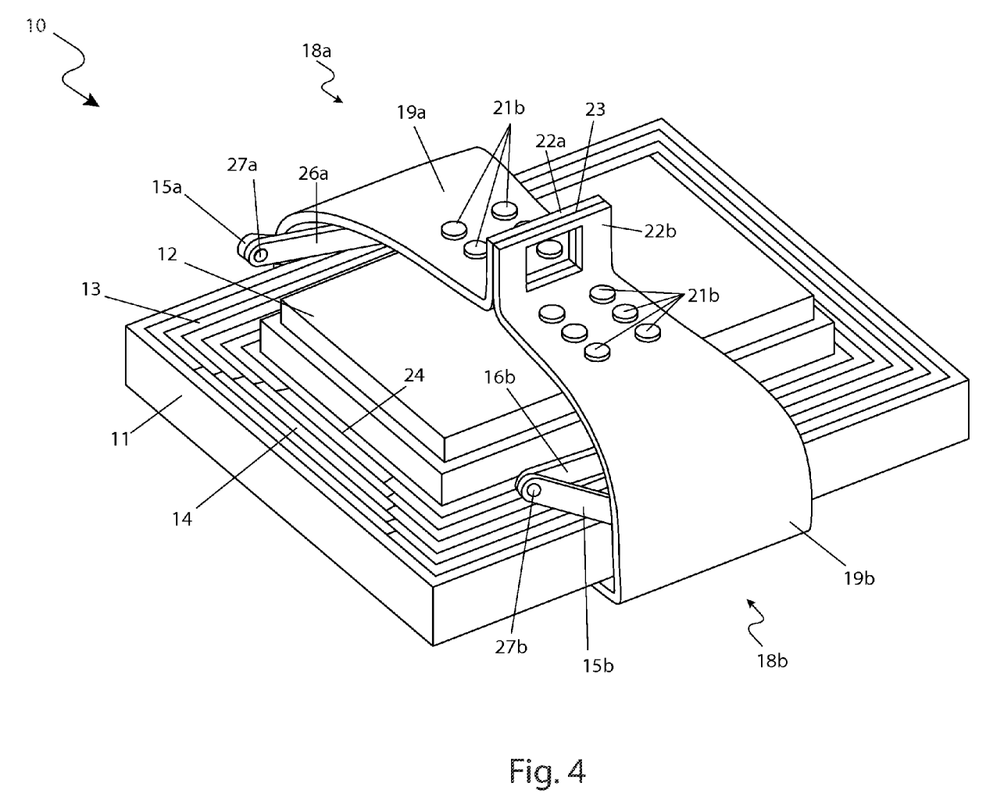
FIG. 4 is a perspective front view of the disposable feline litter box depicted in a collapsed state, according to the preferred embodiment.
Figure 5:
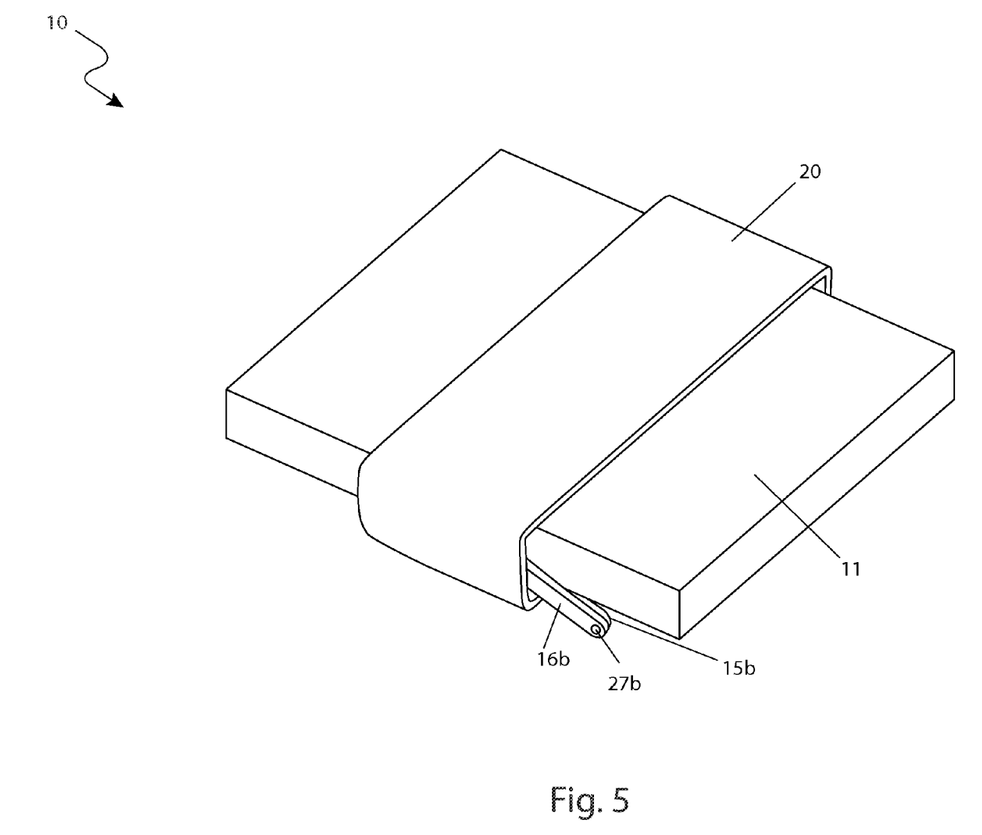
FIG. 5 is a perspective bottom view of the disposable feline litter box, according to the preferred embodiment.
Figure 6A:
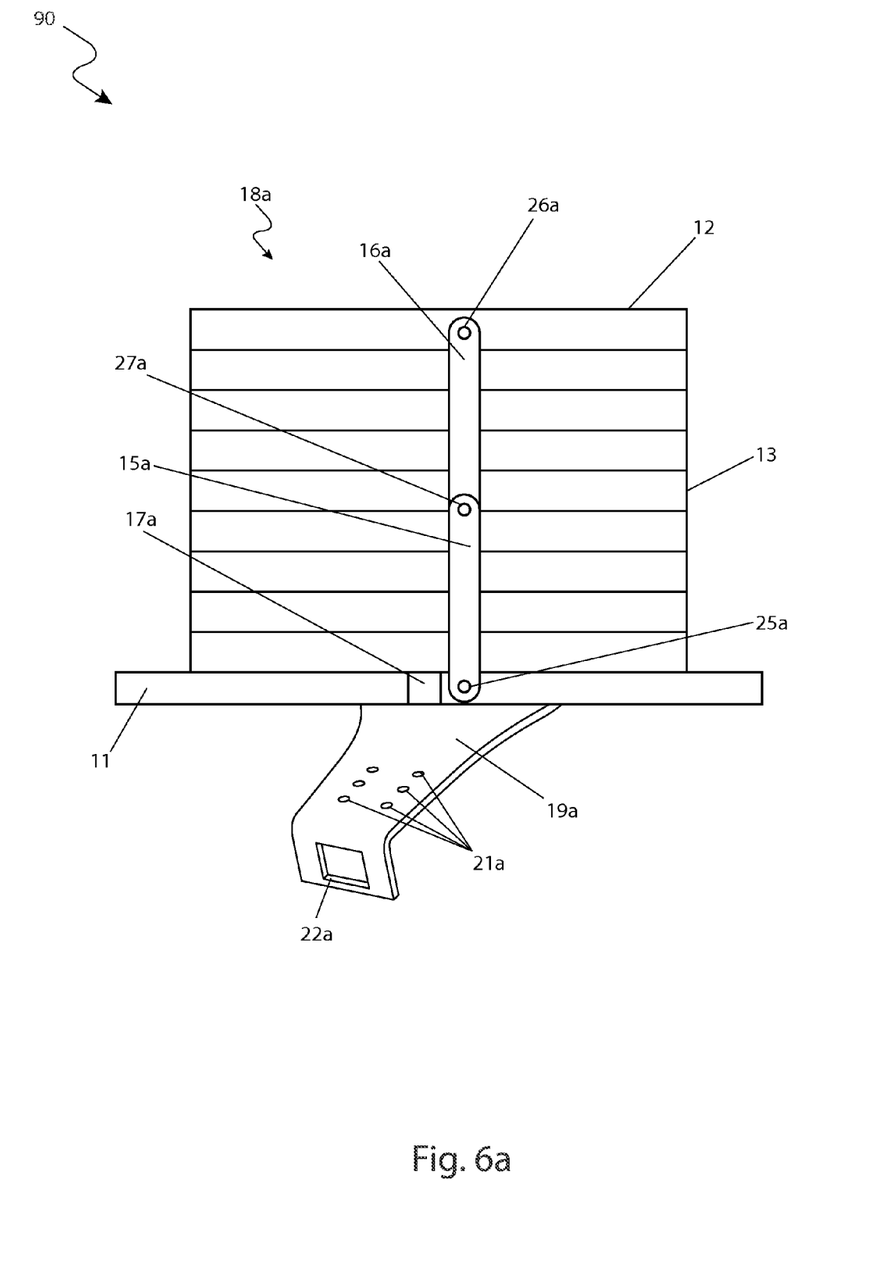
FIG. 6a is a side view of a first alternate disposable feline litter box, according to an alternate embodiment in accordance with the invention.
Figure 6B:
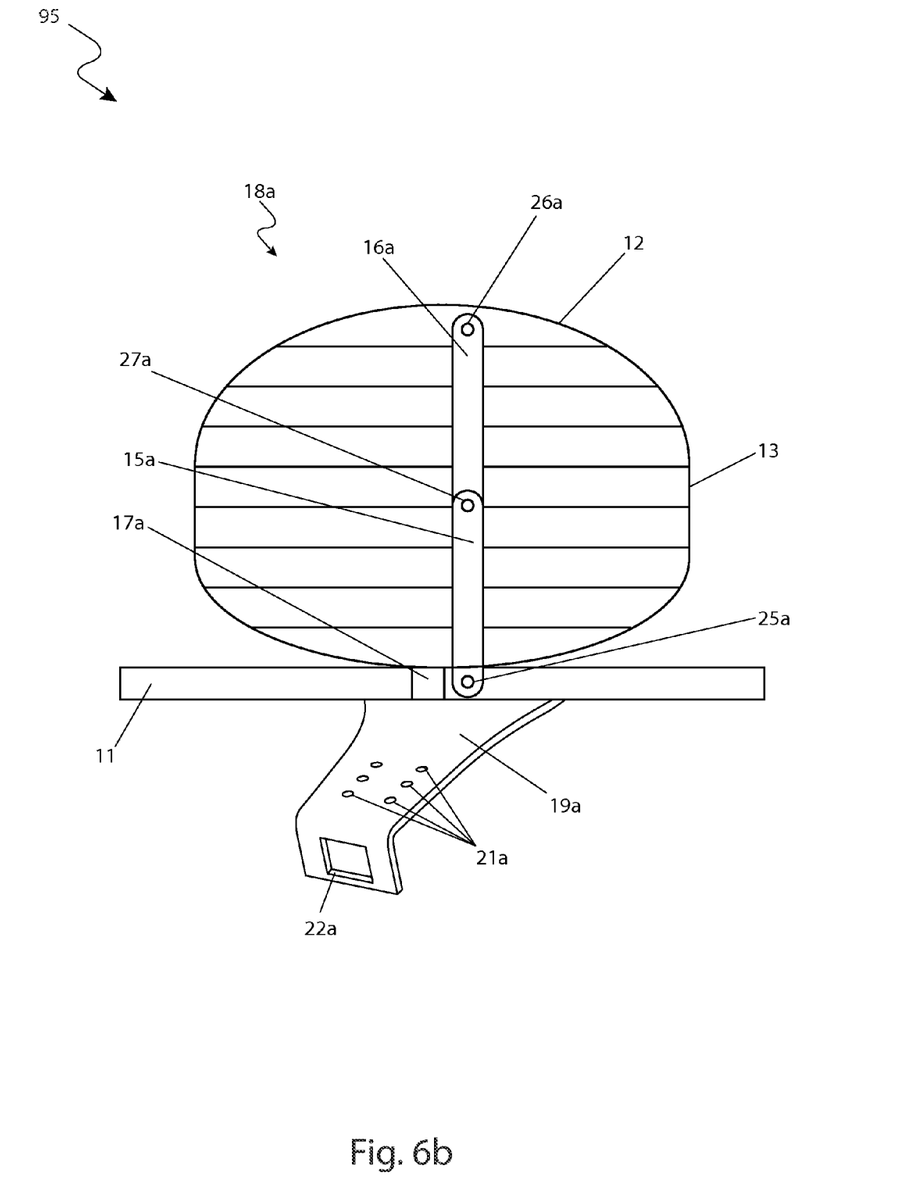
FIG. 6b is a side view of a second alternate disposable feline litter box, according to an alternate embodiment in accordance with the invention.

In accordance with the invention, the best mode is presented in terms of a preferred embodiment, herein depicted within FIGS. 1 through 5, and in terms of alternate embodiments, herein depicted within FIGS. 6a and 6b. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 6b, depicting a disposable feline litter box (herein described as an "apparatus") 10, where like reference numerals represent similar or like parts.

In accordance with the invention, the present disclosure describes a deployable pet litter container that provides portability and temporary use for the biodegradable and sanitary disposal of feline litter after urination or defecation.

Figure 1:
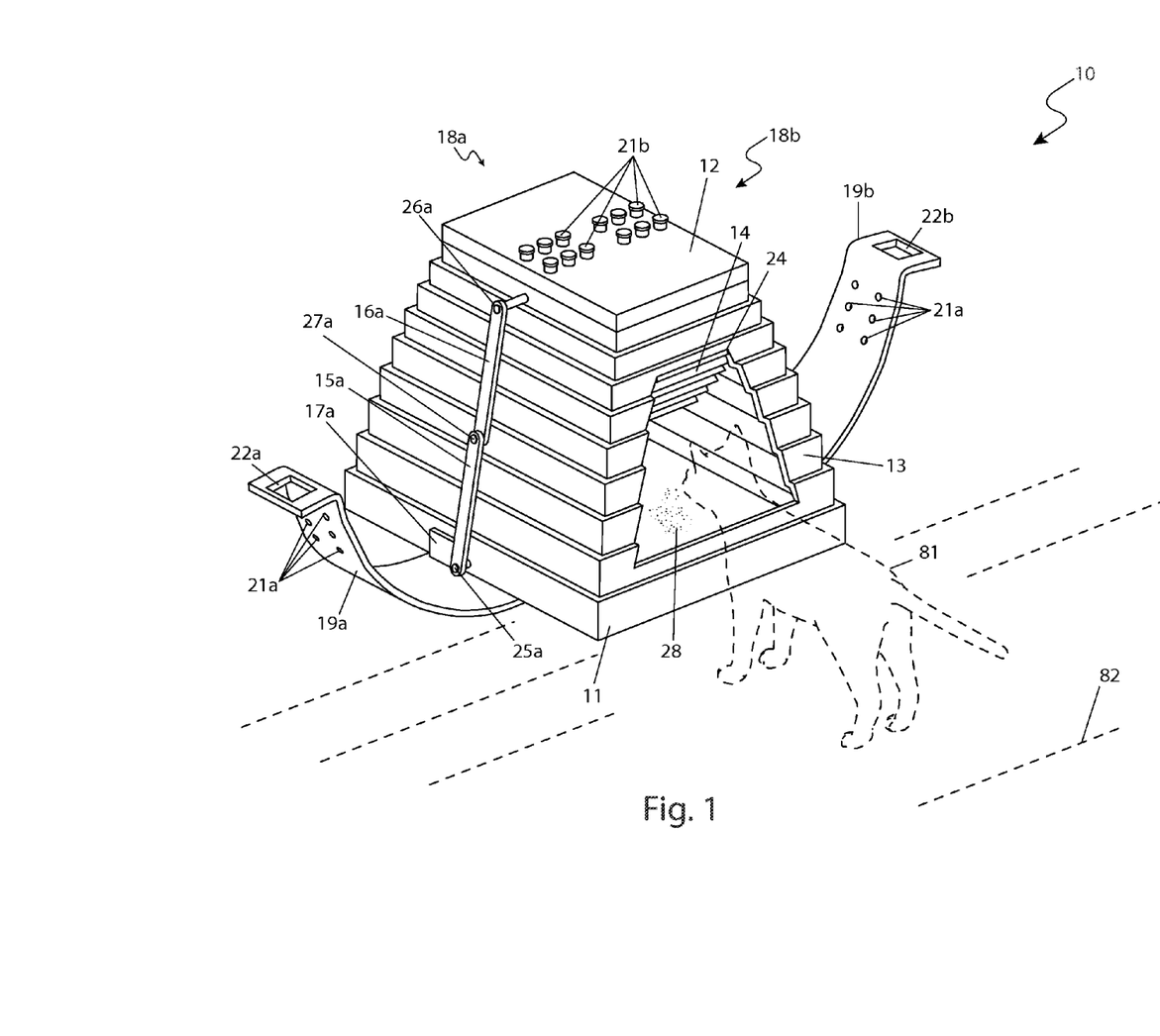
FIG. 1 is an environmental view of a disposable feline litter box, according to a preferred embodiment in accordance with the invention.

FIG. 1 shows a perspective environmental view of the apparatus 10. The apparatus 10 is depicted in a state wherein a feline 81 is pushing a door 14 inwardly while entering an upwardly expanded enclosure. The apparatus 10 includes a tray 11 wherein the interior portion includes an integral package of litter 28. The components of the apparatus 10 are made of short-term bio-degradable materials, such as paper, cardboard, fiberboard, or bio-plastics. The truncated pyramid design minimizes the height of the enclosure 13 in a collapsed state by allowing each corrugation to progressively fold into the next lower corrugation, yet it can be appreciated that other designs may be utilized without limiting the scope of the apparatus 10, as shown in alternate embodiments in FIGS. 6a and 6b.

Figure 2:
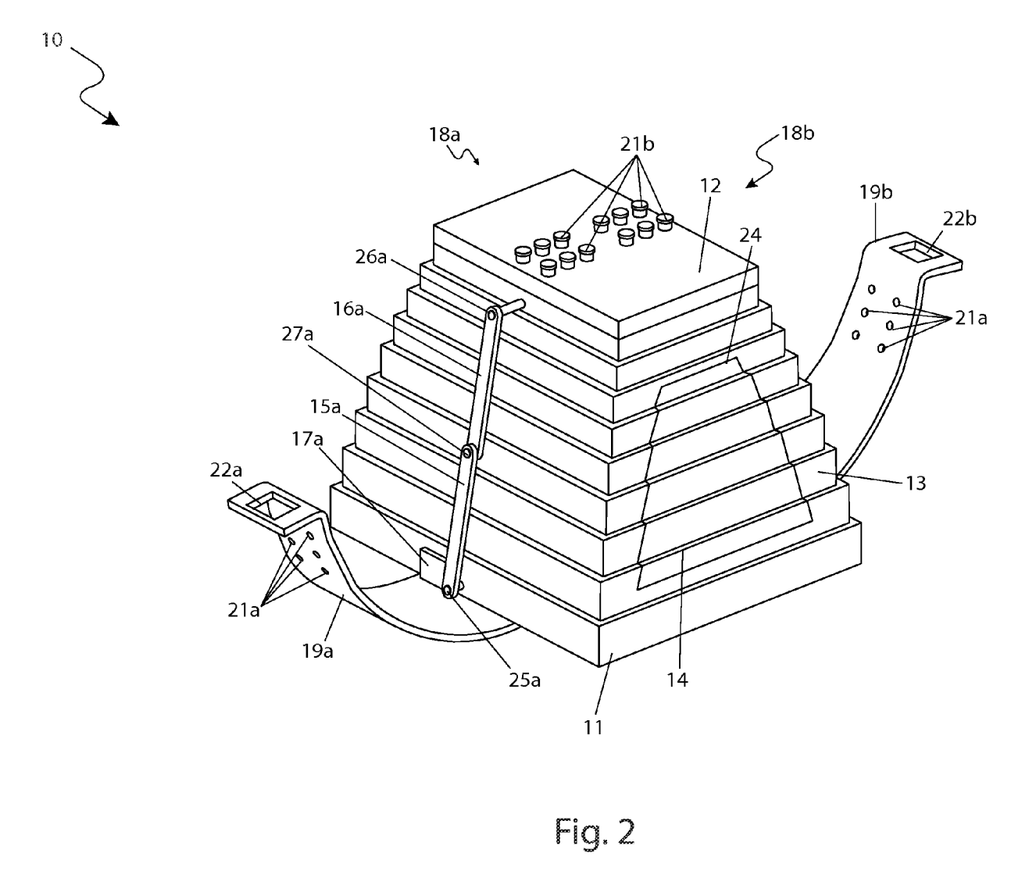
FIG. 2 is a perspective front view of the disposable feline litter box depicted in an expanded state, according to the preferred embodiment.
Figure 3:
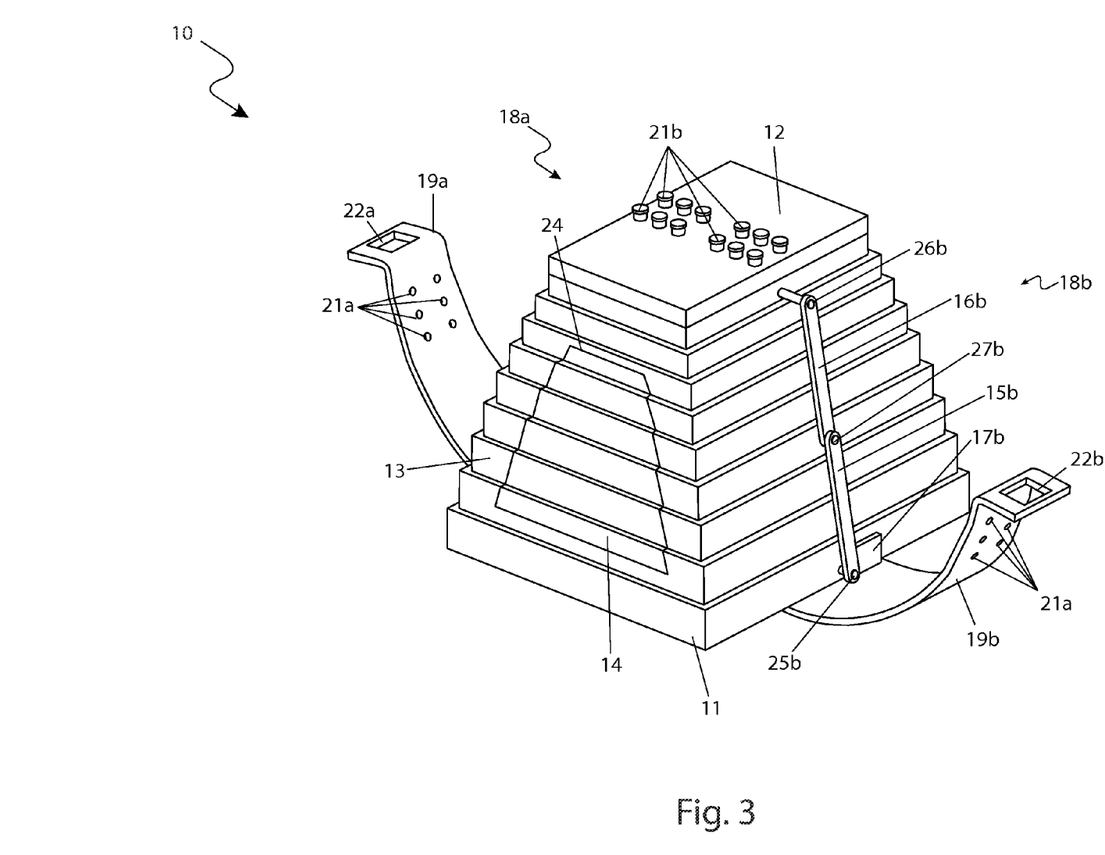
FIG. 3 is an opposing perspective front view of the disposable feline litter box depicted in the expanded state, according to the preferred embodiment.

FIG. 2 and FIG. 3 show opposing perspective front views of the apparatus 10 depicted in an upwardly expanded state. The apparatus 10 includes a tray 11, a top 12, and an enclosure 13; wherein a front face portion of the enclosure includes a door 14. The corrugated design allows the enclosure 13 and the door 14 to be collapsed into a compact and collapsed state (see FIG. 4) when not in use or when transported and to be expanded in an upward direction to accommodate a feline 81 during use. A first side of the apparatus 10 includes a first stay 18a made up of a first link 15a and a second link 15b. An opposing second side of the apparatus 10 includes a corresponding second stay 18b made up of a third link 16a and a fourth link 16b.

A first pivot 25a connects a lower end of the first link 15a to a bottom portion of the first side of the tray 11, a fifth pivot 27a connects an upper end of the first link 15a to a lower end of the third link 16a, and a third pivot 26a connects the upper end of the third link 16a to a first side of the top 12. Likewise, a second pivot 25b connects a lower end of the second link 15b to a corresponding opposing bottom portion of the second side of the tray 11, a sixth pivot 27b connects an upper end of the second link 15b to a lower end of the fourth link 16b, and a fourth pivot 26b connects the upper end of the fourth link 16b to an opposite second side of the top 12.

A rearward past-center position of the fifth pivot 27a and the sixth pivot 27b maintains the expanded state of the accordion-like enclosure 13 by causing a lower side portion of the first link 15a to rest against a first stop 17a, while the corresponding lower side portion of the second link 15b rests against a second stop 17b. Each stop 17a, 17b is attached to an intermediate exterior surface of the tray 11 with integral molding, adhesive, or the like.

The apparatus 10 also includes a strap 20 having a first strap end 19a and a second strap end 19b, each depicted as detached with the apparatus 10 in the deployed state. An underside surface of the first strap end 19a and of the second strap end 19b each includes a plurality of first snap fasteners 21a. The first snap fasteners 21a are arranged in a matrix and correspondingly engage a plurality of second snap fasteners 21b located on an upper outer surface of the top 12 of the enclosure 13.

FIG. 4 shows a perspective view of the apparatus 10 depicted in the collapsed state and FIG. 5 shows a bottom perspective view of the apparatus 10. The strap 20, as depicted in FIG. 5, provides the apparatus 10 with a mechanism to maintain the enclosure 13 in the collapsed state. The strap 20 wraps circumferential around a central exterior surface of the tray 11, enclosure 13, and top 12 when in the collapsed state such that the first snap fasteners 21a of the pair of flexible strap ends 19a and 19b engage with the second snap fasteners 21b to maintain the collapsed state. An outer end portion of the first strap end 19a includes a first handle member 22a and a corresponding outer end portion of the second strap end 19b includes a second handle member 22b. When each of the pair of strap ends 19a and 19b is fastened onto the top 12, the close proximity of the handle members 22a and 22b form a suitable carrying handle 23.

The door 14 is preferably an inwardly and outwardly mobile flap, including a hinge 24 in the form of a paper strip permanently affixed onto an upper edge of the door 14 and the upper edge of the corresponding opening within the enclosure 13. In the collapsed state, the enclosure 13 retains the door 14 in a closed state. Extending the enclosure 13 in the upward direction releases the door, enabling it to function as a two-way flap.

FIGS. 6a and 6b show side views of a first alternate disposable feline litter box 90 and second alternate disposable feline litter box 95. The enclosure 13 is depicted in the preferred embodiment as having a pyramidal or trapezoidal shape; however, it can be appreciated that other shapes can be utilized with equal benefit and without limiting the scope of the apparatus 10. The alternate disposable feline litter boxes 90, 95 include structural and functional components substantially similar to those described for the preferred embodiment of the apparatus 10 with the exception of the shape of the enclosure 13. FIG. 6a depicts the first alternate enclosure 90 which has a generally rectangular shape and FIG. 6b depicts the second alternate enclosure 95 which has a generally circular shape, with each providing the same functionalities as abovementioned.

It is envisioned that other styles and configurations can be easily incorporated into the teachings of the present disclosure and only one particular configuration has been shown and described for purposes of clarity and disclosure and not by way of limitation of scope.

In accordance with the invention, the preferred embodiment can be utilized by the user in a simple and effortless manner with little or no training. After initial purchase or acquisition of the apparatus 10 in the collapsed state, it would be deployed as indicated in FIG. 1.

The method of deploying the apparatus 10 can be achieved by performing the following steps: carrying the apparatus 10 to a desired location; setting the apparatus 10 onto a floor 82 at the desired location; unfastening the first strap end 19a; deploying the first strap end 19a; unfastening the second strap end 19b; deploying the second strap end 19b; extending the enclosure 13 vertically by simultaneously moving the first stay 18a and the second stay 18b in a rearward direction; and, securing the extended state by moving the links 15a, 15b, 16a, 16b in the rearward direction until the lower side portion of the first link 15a abuts the first stop 17a and the lower side portion of the second link 15b abuts the second stop 17b.

The method of utilizing the apparatus 10 can be achieved by performing the following steps: allowing the feline 81 to open the door 14 and use the apparatus 10; after use, collapsing and securing the apparatus 10 into the collapsed state by following the above steps in a reverse order; and, disposing the apparatus 10 in an approved manner.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A disposable feline litter box comprising:
a tray receptacle having a litter-filled interior;
a corrugated enclosure affixed to said tray receptacle, said enclosure being upwardly extendable to an expanded state and downwardly retractable to a collapsed state;
a top affixed to an upper end of said enclosure;
an opening disposed in a forward facing side of said enclosure for ingress and egress of a feline;
a door hingedly attached to said enclosure for covering said opening;
two pairs of linkages, each of said pair of linkages being pivotably attached between a middle of said tray receptacle and a middle of said top on opposing sides of said enclosure; and
a pair of stops, each of said pair of stops comprising a solid body comprising at least one flat side extending outwardly from opposing sides of said tray receptacle proximate said middle of said tray receptacle and adjacent to a lower end portion of each of said pair of linkages;
wherein said pair of linkages pivot to a generally horizontal orientation to maintain said enclosure in said collapsed state and to a generally vertical orientation to maintain said enclosure in said expanded state; and
wherein a side edge of said lower end portion each of said pair of linkages abuts said flat side of one of said pair of stops when said enclosure is in said expanded state.

2. The litter box of claim 1, wherein said enclosure further comprises a housing defining a hollow interior having a plurality of interconnected folds disposed between said tray receptacle and said top;
wherein said top is movable toward and away from said tray receptacle to extend and retract said enclosure.

3. The litter box of claim 2, wherein said enclosure further comprises a generally pyramidal shape;
wherein each of said plurality of interconnected folds collapse inwardly upon an adjacent fold to place said enclosure in said collapsed state.

4. The litter box of claim 1, wherein each of said pair of linkages further comprises:
a lower link having a lower end pivotably connected to said opposing sides of said tray receptacle and an upper end; and,
an upper link having a lower end pivotably connected to said lower link upper end and an upper end pivotably connected to opposing sides of said top.

5. The litter box of claim 1, further comprising a pair of straps, each of said pair of straps comprising an end affixed to said tray receptacle and an opposing free end releasably secured to said top around said enclosure to retain said enclosure in said collapsed state.

6. The litter box of claim 5, wherein said top further comprises a plurality of fasteners which releasably fasten to said free ends of each of said pair of straps.

7. The litter box of claim 5, wherein said free end of each of said pair of straps further comprises a plurality of first snap features; and,
said top further comprises a plurality of second snap features;
wherein said first snap features engagingly mate with said second snap features to secure said straps to said top.

8. The litter box of claim 7, wherein said opposing end of each of said pair of straps further comprises a handle.

9. The litter box of claim 1, wherein said enclosure further comprises sides having a plurality of accordion pleats;

wherein said pleats are movable toward each other to place said enclosure in said collapsed state; and, wherein said pleats are movable away from each other to place said enclosure in said expanded state.

10. The litter box of claim 9, wherein said door further comprises a plurality of accordion-like pleats;

wherein said door extends and retracts concurrent with said enclosure.

11. The litter box of claim 10, wherein said enclosure further comprises a generally spherical shape.

12. The litter box of claim 10, wherein said enclosure further comprises a generally cubical shape.

13. A disposable feline litter box comprising:

a generally rectangular tray having a litter-filled interior receptacle;

an enclosure defining a hollow interior affixed over said tray and comprising sides having a plurality of accordion pleats, said enclosure being upwardly extendable to an expanded state and downwardly retractable to a collapsed state;

a top affixed to an upper end of said enclosure;

an opening disposed in at least one of said sides of said enclosure for ingress and egress of a feline;

a door hingedly attached to said enclosure for covering said opening;

two pairs of linkages, each of said pair of linkages being pivotably attached between a middle of said tray and a middle of said top on opposing ones of said sides of said enclosure;

a pair of stops, each of said pair of stops comprising a solid body comprising at least one flat side extending outwardly from opposing sides of said tray proximate said middle of said tray and adjacent to a lower end portion of each of said pair of linkages; and, a pair of straps, each of said pair of straps comprising an end affixed to said tray and an opposing free end;

wherein said pleats are movable toward each other to place said enclosure in said collapsed state;

wherein said pair of linkages pivot to a generally horizontal orientation when said enclosure is in said collapsed state;

wherein said free ends of said pair of straps are releasably secured to said top around said enclosure to retain said enclosure in said collapsed state;

wherein said pleats are movable away from each other to place said enclosure in said expanded state;

wherein said pair of linkages pivot to a generally vertical orientation to maintain said enclosure is in said expanded state; and, wherein a side edge of said lower end portion of each of said pair of linkages abuts said flat side of one of said pair of stops when said enclosure is in said expanded state.

14. The litter box of claim 13, wherein said free ends of each of said pair of straps further comprises a plurality of first snap features; and, said top further comprises a plurality of second snap features;

wherein said first snap features engagingly mate with said second snap features to secure said straps to said top when said enclosure is in said collapsed state.

15. The litter box of claim 14, wherein each of said pair of linkages further comprises:

a lower link having a lower end pivotably connected to said opposing sides of said tray and an upper end;

an upper link having a lower end pivotably connected to said lower link upper end and an upper end pivotably connected to opposing sides of said top.

16. The litter box of claim 15, wherein said free end of each of said pair of straps further comprises a handle.

17. The litter box of claim 16, wherein said door further comprises a plurality of accordion pleats;

wherein said door extends and retracts concurrent with said enclosure.

* * * * *